US009901997B2

(12) United States Patent
Pierce et al.

(10) Patent No.: US 9,901,997 B2
(45) Date of Patent: Feb. 27, 2018

(54) PIPE CUTTING APPARATUS, KIT, AND METHOD

(71) Applicant: Illinois Tool Works Inc., Glenview, IL (US)

(72) Inventors: Kenneth R. Pierce, Arlington Heights, IL (US); Alexander S. Giberman, Northbrook, IL (US); Michael W. Gearhart, Wheeling, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 323 days.

(21) Appl. No.: 14/749,076

(22) Filed: Jun. 24, 2015

(65) Prior Publication Data

US 2016/0375508 A1    Dec. 29, 2016

(51) Int. Cl.
  *B23B 5/00*     (2006.01)
  *B23D 21/14*    (2006.01)
  *B23B 5/16*     (2006.01)
  *B23B 29/034*   (2006.01)

(52) U.S. Cl.
  CPC .............. *B23D 21/14* (2013.01); *B23B 5/162* (2013.01); *B23B 29/03453* (2013.01); *B23B 29/03467* (2013.01)

(58) Field of Classification Search
  CPC ......... B23D 21/14; B23B 5/162; B23B 5/167; B23B 5/168; B23B 2260/146; E21B 29/005; B26D 3/001; B26D 7/2614; C03B 33/14; B24B 33/02
  See application file for complete search history.

(56) References Cited

U.S. PATENT DOCUMENTS

| | | | | |
|---|---|---|---|---|
| 560,099 A | * | 5/1896 | Kranzer | B23D 21/145 30/107 |
| 695,482 A | * | 3/1902 | Byrne et al. | B23D 21/145 30/107 |
| 1,358,818 A | * | 11/1920 | Bering | E21B 29/005 166/55.7 |

(Continued)

FOREIGN PATENT DOCUMENTS

| EP | 1 241 321 A2 | 9/2002 |
|---|---|---|
| EP | 1241321 A2 | 9/2002 |

(Continued)

OTHER PUBLICATIONS

International Search Report and Written Opinion from PCT/US2016/029435, dated Jul. 12, 2016, 15 pages.

(Continued)

*Primary Examiner* — Will Fridie, Jr.
(74) *Attorney, Agent, or Firm* — Klintworth & Rozenblat IP LLP

(57) ABSTRACT

An apparatus for cutting pipes internally includes at least one cutting member, at least one drive member, at least one feed member, and at least one clamping member. The at least one cutting member cuts a pipe internally. The at least one drive member rotates the at least one cutting member to cut the pipe internally. The at least one feed member extend the at least one cutting member against the pipe internally and retracts the at least one cutting member from the pipe internally. The at least one clamping member secures the apparatus to the pipe internally.

22 Claims, 17 Drawing Sheets

(56) References Cited

U.S. PATENT DOCUMENTS

| | | | | |
|---|---|---|---|---|
| 1,643,709 A * | 9/1927 | Fawcett | ............... | E21B 29/005 166/55.7 |
| 1,728,069 A * | 9/1929 | Meijer | ............... | E21B 29/005 166/55.7 |
| 2,125,864 A * | 8/1938 | Auckland | ............... | C03B 33/14 15/104.09 |
| 2,494,193 A | 1/1950 | Patrick, Jr. | | |
| 3,230,834 A | 1/1966 | Bohannon | | |
| 3,293,963 A * | 12/1966 | Carroll | ............... | B23D 21/14 82/128 |
| 3,468,373 A | 9/1969 | Smith | | |
| 3,700,343 A | 10/1972 | Parry | | |
| 3,859,877 A * | 1/1975 | Sherer | ............... | B23B 29/02 82/100 |
| 3,977,076 A * | 8/1976 | Vieira | ............... | B23D 21/14 30/103 |
| 4,389,765 A * | 6/1983 | Thompson, Jr. | ....... | B23D 21/14 166/55.8 |
| 4,424,629 A * | 1/1984 | Schott | ............... | B23D 21/08 30/105 |
| 4,712,302 A * | 12/1987 | Diller | ............... | B23D 21/14 30/107 |
| 5,692,421 A * | 12/1997 | Rohrberg | ............ | B21D 19/046 82/1.2 |
| 6,626,074 B1 * | 9/2003 | Wheeler | ............. | B23D 45/128 166/117 |
| 2003/0002938 A1 | 1/2003 | Maar | | |
| 2007/0131410 A1 | 6/2007 | Hill et al. | | |
| 2010/0197199 A1 * | 8/2010 | Flores | ............... | B24B 33/088 451/27 |
| 2010/0258289 A1 * | 10/2010 | Lynde | ............... | E21B 23/14 166/55.7 |
| 2011/0000668 A1 | 1/2011 | Tunget | | |
| 2011/0041658 A1 | 2/2011 | Weinberg | | |
| 2011/0192589 A1 * | 8/2011 | Fuhst | ............... | E21B 29/005 166/55 |
| 2015/0047478 A1 | 2/2015 | DHooge | | |
| 2016/0375509 A1 * | 12/2016 | Pierce | ............... | B23B 5/162 83/54 |

FOREIGN PATENT DOCUMENTS

| | | |
|---|---|---|
| GB | 299 677 A | 11/1928 |
| GB | 299677 | 11/1928 |
| WO | 02/29201 A1 | 4/2002 |

OTHER PUBLICATIONS

External-Internal Casing Cutter (EICC) User's Manual, Part No. 60-MAN-05, Rev. A, E.H. Wachs, 72 pages.
International Search Report and Written Opinion for PCT/US2016/029534 dated Jul. 19, 2016, 16 pages.

* cited by examiner

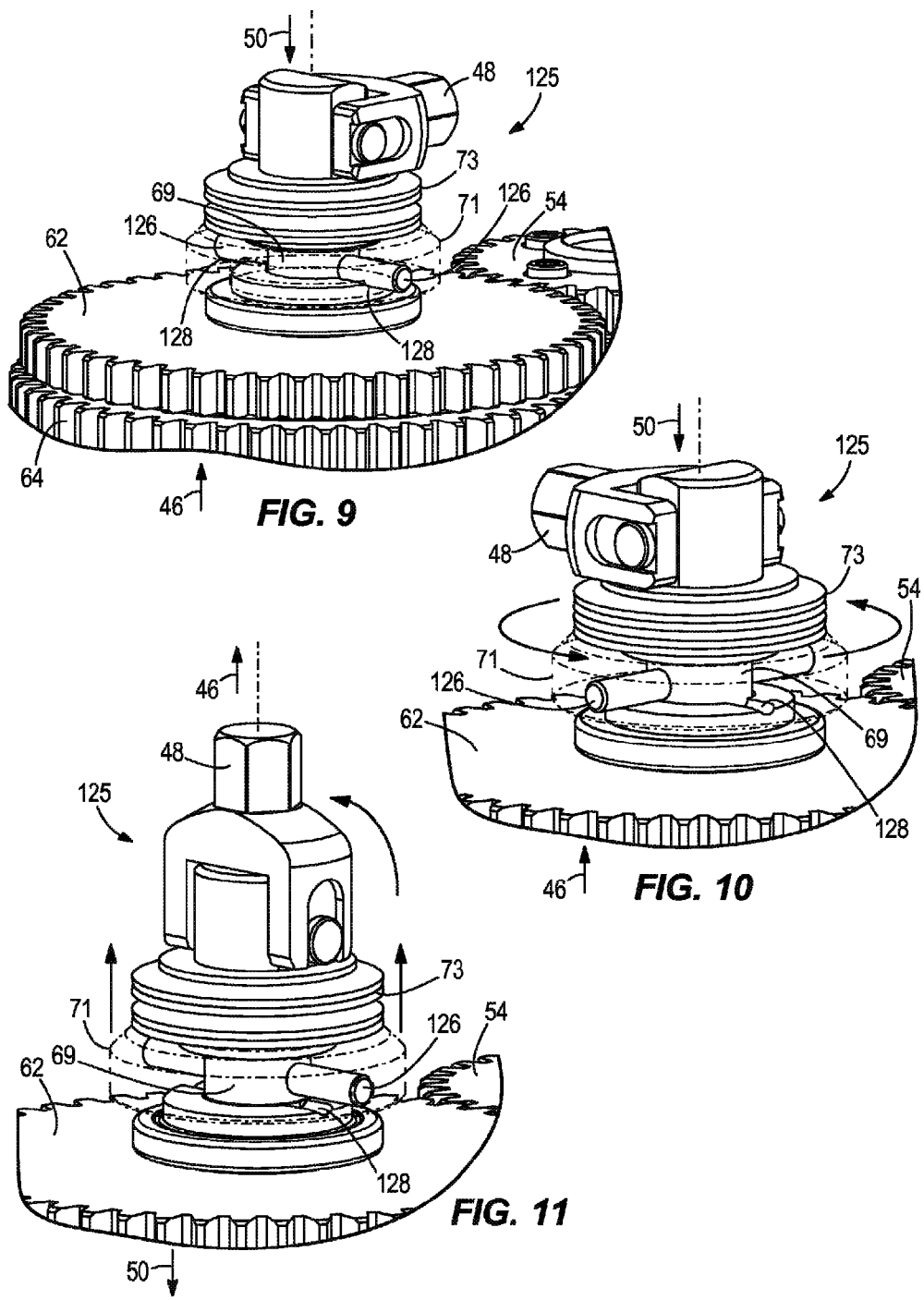

PIPE CUTTING APPARATUS, KIT, AND METHOD

FIELD OF THE DISCLOSURE

The disclosure relates to apparatus, kits, and methods for cutting pipes.

BACKGROUND

Pipes, in or out of the ground, are often needed to be cut internally in order to seal off the pipe. A variety of apparatus, kits, and methods exist for internally cutting pipes. However, these apparatus, kits, and methods often are difficult to use or apply. Such issues may include one or more of the following: difficulty in using the apparatus to cut varying sized pipes, difficulty in centering the apparatus in a pipe, difficulty in securing the apparatus to a pipe, difficulty in abutting a cutting member of the apparatus against a pipe, difficulty in driving a cutting member of the apparatus against a pipe, difficulty in protecting a cutting member of the apparatus in the event of excessive force during cutting a pipe, difficulty in removing the apparatus from a pipe, or one or more other difficulties.

Apparatus, kits, and methods are needed to reduce or eliminate one or more issues of one or more of the current apparatus, kits, and methods for internally cutting a pipe.

SUMMARY

In one embodiment, an apparatus for cutting pipes internally includes at least one cutting member, at least one drive member, at least one feed member, and at least one clamping member. The at least one cutting member cuts a pipe internally. The at least one drive member rotates the at least one cutting member to cut the pipe internally. The at least one feed member extend the at least one cutting member against the pipe internally and retracts the at least one cutting member from the pipe internally. The at least one clamping member secures the apparatus to the pipe internally.

In another embodiment, an apparatus for cutting pipes internally includes at least one cutting member, at least one drive member, at least one feed member, at least one motor, and a plurality of connected differing sized gears. The at least one cutting member cuts a pipe internally. The at least one drive member rotates the at least one cutting member to cut the pipe internally. The at least one feed member extends the at least one cutting member against the pipe internally and retracts the at least one cutting member from the pipe internally. The plurality of connected differing sized gears are connected to the at least one motor, to the at least one drive member, and to the at least one feed member. The at least one drive member rotates at a different drive rate than a feed rate of the at least one feed member due to a gear ratio of the plurality of connected differing sized gears.

In still another embodiment, a method of a method of cutting pipes internally is disclosed. In one step, a pipe cutting apparatus is disposed into a pipe. In another step, the pipe cutting apparatus is clamped within the pipe using at least one clamping member of the pipe cutting apparatus. In another step, at least one cutting member of the pipe cutting apparatus is extended against an internal surface of the pipe using at least one feed member of the pipe cutting apparatus. In yet another step, the at least one cutting member is rotated with at least one drive member of the pipe cutting apparatus in order to cut the internal surface of the pipe with the at least one cutting member.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

FIG. 9 illustrates a perspective view of a clutch assembly of the apparatus of the embodiment of FIG. 1 with a clutch member disposed in a down position and a clutch assembly being engaged;

FIG. 10 illustrates the clutch assembly of the embodiment of FIG. 9 with the clutch member disposed in the down position and the clutch assembly disengaged;

FIG. 11 illustrates the perspective view of the clutch assembly of the embodiment of FIG. 9 with the clutch member having been manually moved to an up position to disengage the clutch assembly;

DETAILED DESCRIPTION

Figures 1, 2:
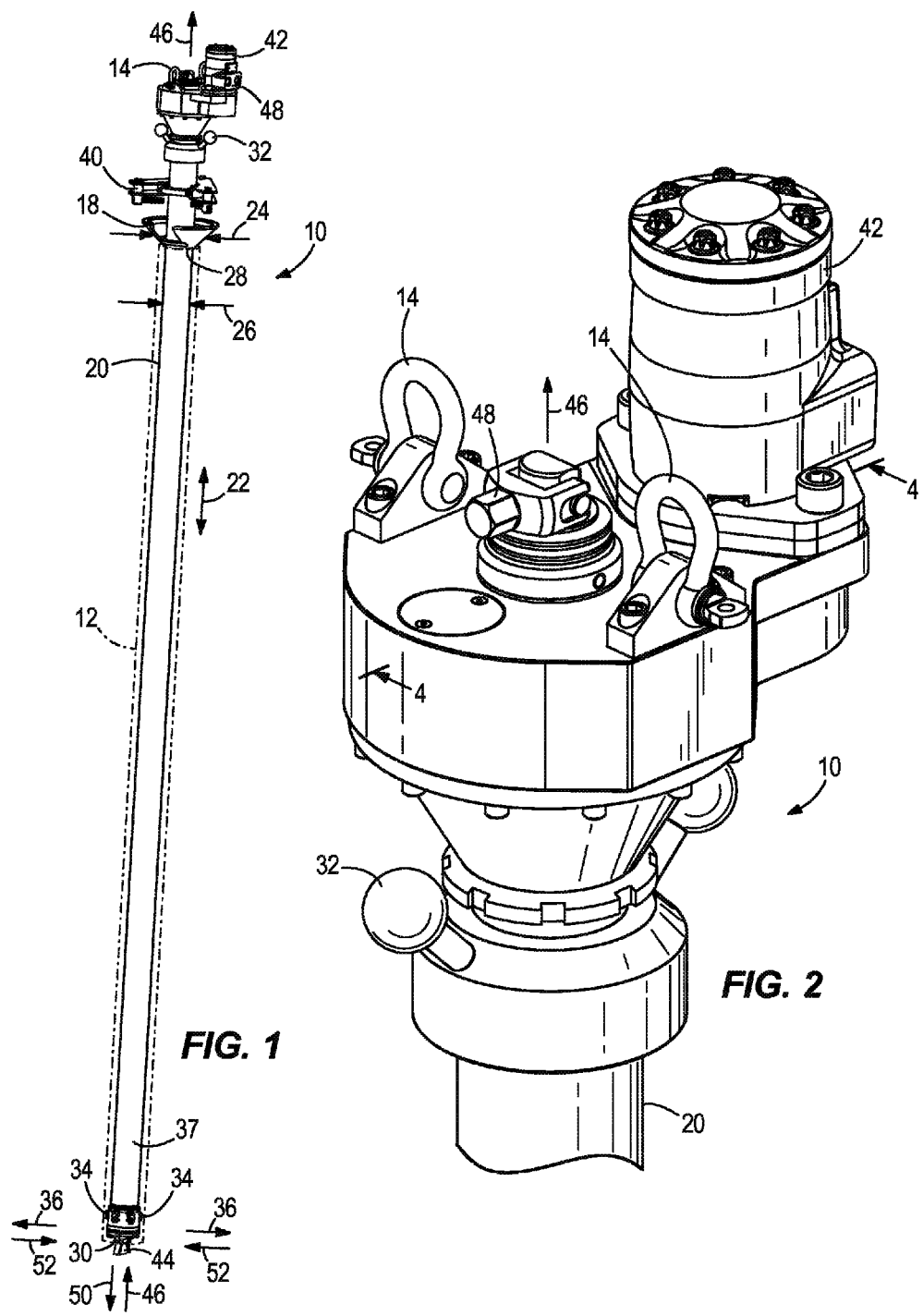
FIG. 1 is a perspective view illustrating one embodiment of an apparatus for cutting a pipe internally.
FIG. 2 is a perspective view of a top portion of the apparatus of the embodiment of FIG. 1.
Figure 3:
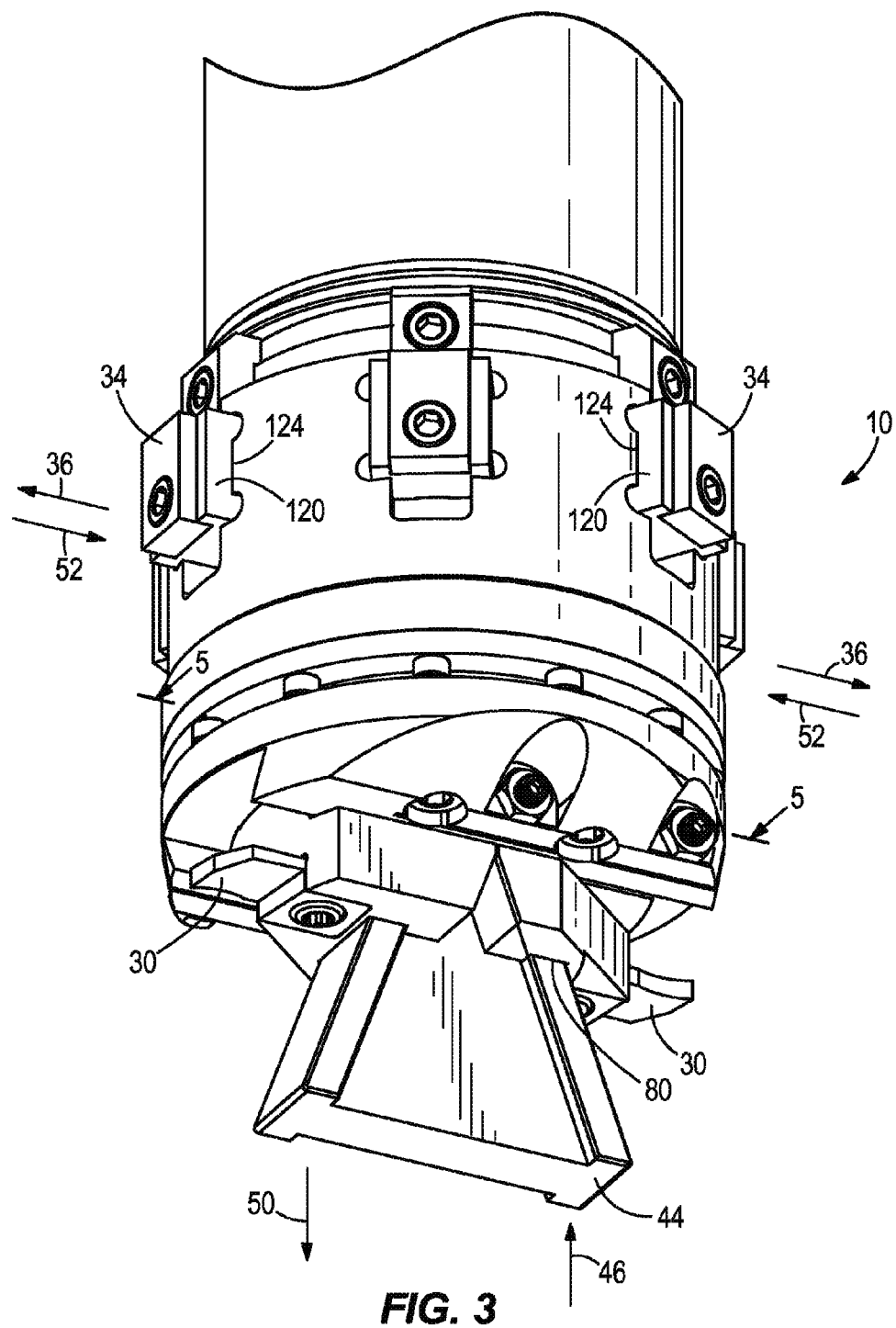
FIG. 3 is a perspective view of a bottom portion of the apparatus of the embodiment of FIG. 1.

FIG. 1 is a perspective view illustrating one embodiment of an apparatus 10 for cutting a pipe 12 internally. FIG. 2 is a perspective view of a top portion of the apparatus 10 of the embodiment of FIG. 1. FIG. 3 is a perspective view of a bottom portion of the apparatus 10 of the embodiment of FIG. 1. The following segment of the disclosure refers to FIGS. 1-3 collectively. A hook 14 is disposed at a top portion of the apparatus 10. The hook 14 may be used to loop a rope or chain through the hook 14 in order to lower the apparatus 10 into the pipe 12 manually or using a machine. A cone 18 (or centering member) is slide-ably disposed over shaft 20 of the apparatus 10. The cone 18 is configured to slide up and down along shaft 20 in directions 22. A portion of the cone 18 has a diameter 24 which is larger than an outer diameter 26 of the pipe 12. When the apparatus 10 is inserted into the pipe 12 the cone 16 rests against a top portion 28 of the pipe 12 in order to center the apparatus 10 within the pipe 12. The shaft 20 of the apparatus 10 is lowered/slid relative to the cone 16, which is disposed against the top portion 28 of the pipe 12, in order to place cutting members 30 at a desired location at which the pipe 12 is to be cut with the cutting members 30.

When the cutting members 30 are located at the desired location knobs 32 disposed at a top portion of the apparatus 10 are rotated clockwise to extend feet 34 disposed at a bottom portion of the apparatus 10 outwardly in direction 36 to abut against an inner surface 38 of the pipe 12 in order to clamp the apparatus 10 in place relative to the pipe 12. In other embodiments, any manually moving lever may be substituted for the knobs 32. Alternatively, a clamp 40 disposed at a top portion of the apparatus 10 may be used to clamp the apparatus 10 to the pipe 12. A motor 42 is used to move a wedge member 44 disposed at a bottom portion of the apparatus 10 inwardly in direction 46 in order to extend the cutting members 30 against the inner surface 38 of the pipe 12. In other embodiments, the motor 42 may comprise any number of motors. The motor 42 is then used to rotate the cutting members 30 against the inner surface 38 of the pipe 12 in order to cut the pipe 12 internally. It is noted that by rotating the motor 42 in an opposite direction that the wedge member 44 may also be moved outwardly in direction 50 in order to retract the cutting members 30 from the inner surface 38 of the pipe 12.

After the inner surface 38 of the pipe 12 is cut, a clutch member 48 may be manually moved upward in direction 46 to a disengagement position to disengage the wedge member 44 from the motor 42 to allow the wedge member 44 to be moved outwardly in direction 50 in order to retract the cutting members 30 from the inner surface 38 of the pipe 12. The knobs 32 may then be rotated counter-clockwise to retract the feet 34 inwardly in direction 52 to release the feet 34 from the inner surface 38 of the pipe 12 in order to unclamp the apparatus 10 from the pipe 12. The apparatus 10 may then be removed from the pipe 12 manually or using a machine by raising the rope or chain looped through the hook 14.

Figure 4:
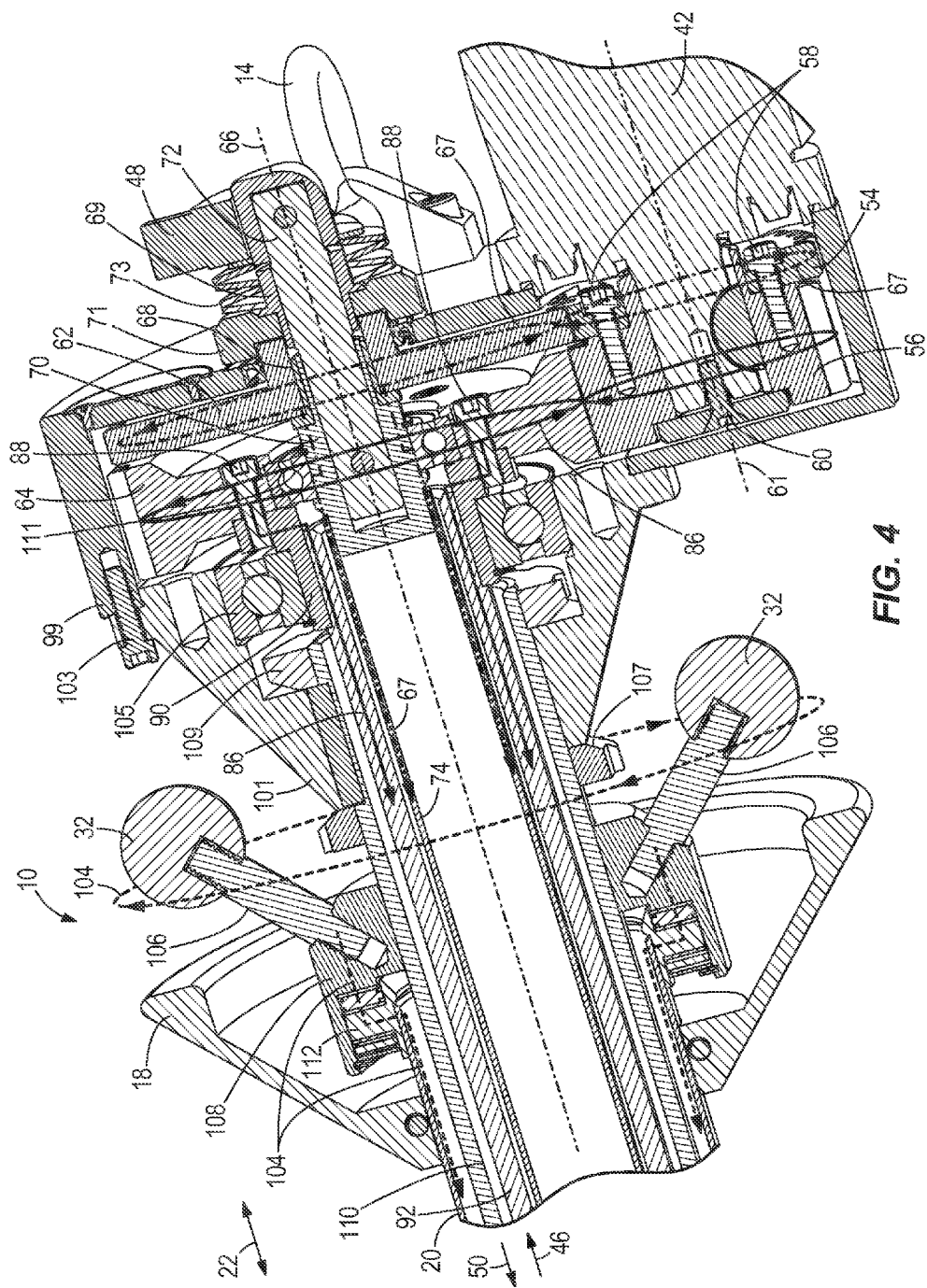
FIG. 4 is a cross-sectional view through line 4-4 of the embodiment of FIG. 2.
Figure 5:
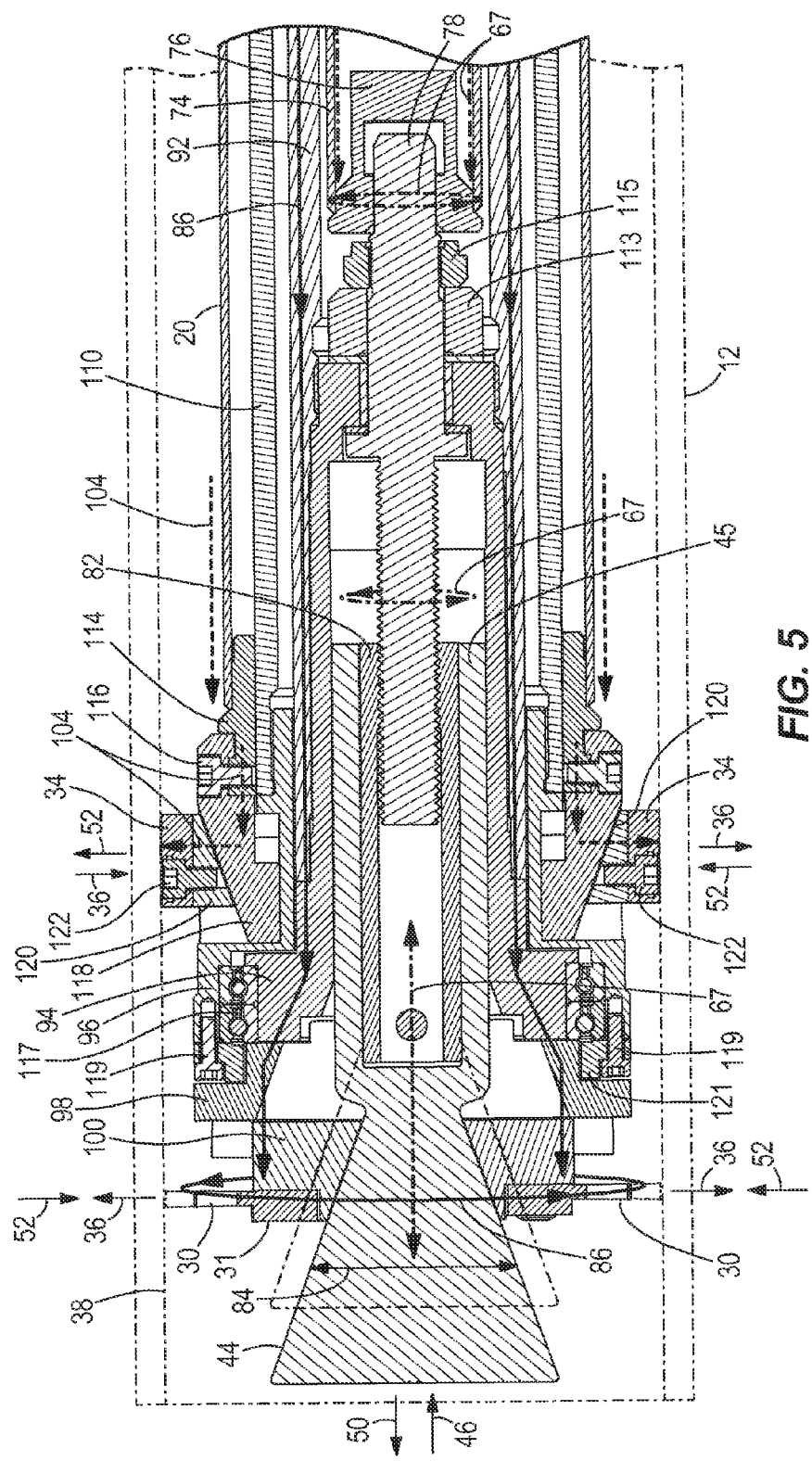
FIG. 5 is a cross-sectional view through line 5-5 of the embodiment of FIG. 3.

FIG. 4 is a cross-sectional view through line 4-4 of the embodiment of FIG. 2. FIG. 5 is a cross-sectional view through line 5-5 of the embodiment of FIG. 3. The following segment of the disclosure refers to FIGS. 4-5 collectively. Motor 42 rotates gears 54 and 56 which are fastened together with fasteners 58 so that they rotate at the same speed around axis 60 of pin 61. Gear 54 rotates gear 62. Gear 56 rotates gear 64. Gears 62 and 64 rotate around axis 66 at differing speeds due to the respective gear-ratio differential caused by gears 54 and 56 being of different size.

The causation of the movement (feed) of wedge member 44 inward in direction 46 and outward in direction 50, as shown by phantom lines 67, will now be described. As previously discussed, when motor 42 rotates gear 54 around axis 60, gear 54 causes gear 62 to rotate around axis 66. Rotation of gear 62 causes attached components shaft 68, shaft 70, pin 72, shaft 69, shaft 71, spring 73, clutch member 48, shaft 74, shaft 76, and screw 78 to rotate with gear 62. As shown in FIG. 3, wedge member 44 is constrained by slot 80 so that it can only move inwardly in direction 46 or outwardly in direction 50. Wedge shaft 45 of wedge 44 is attached to internal shaft 82 which is threadedly attached to screw 78. Since wedge member 44 is constrained to only move outwardly in direction 50 or inwardly in direction 46, when screw 78 is rotated in the clockwise direction wedge shaft 45 and wedge member 44 gradually move inwardly in direction 46 and when screw 78 is rotated in the counter-clockwise direction wedge shaft 45 and wedge member 44 gradually move outwardly in direction 50.

When the wedge member 44 is moved (fed) inwardly in direction 46 the gradually increasing width 84 of the wedge member 44 causes the cutting members 30 to move outwardly in direction 36 to abut the cutting members 30 against the internal surface 38 of the pipe 12. When the wedge member 44 is moved (fed) outwardly in direction 50 the gradually decreasing width 84 of the wedge member 44 causes the cutting members 30 to move inwardly in direction 52 to be removed from the internal surface 38 of the pipe 12. For purposes of this disclosure, the term "feed member" is defined as any component of the apparatus 10 which causes the cutting members 30 to move outwardly in direction 36 or inwardly in direction 52. The feed members include but are not limited to motor 42, gear 54, gear 62, shaft 68, shaft 70, pin 72, shaft 69, shaft 71, spring 73, clutch member 48, shaft 74, shaft 76, screw 78, slot 80, internal shaft 82, and wedge member 44.

Figure 6:
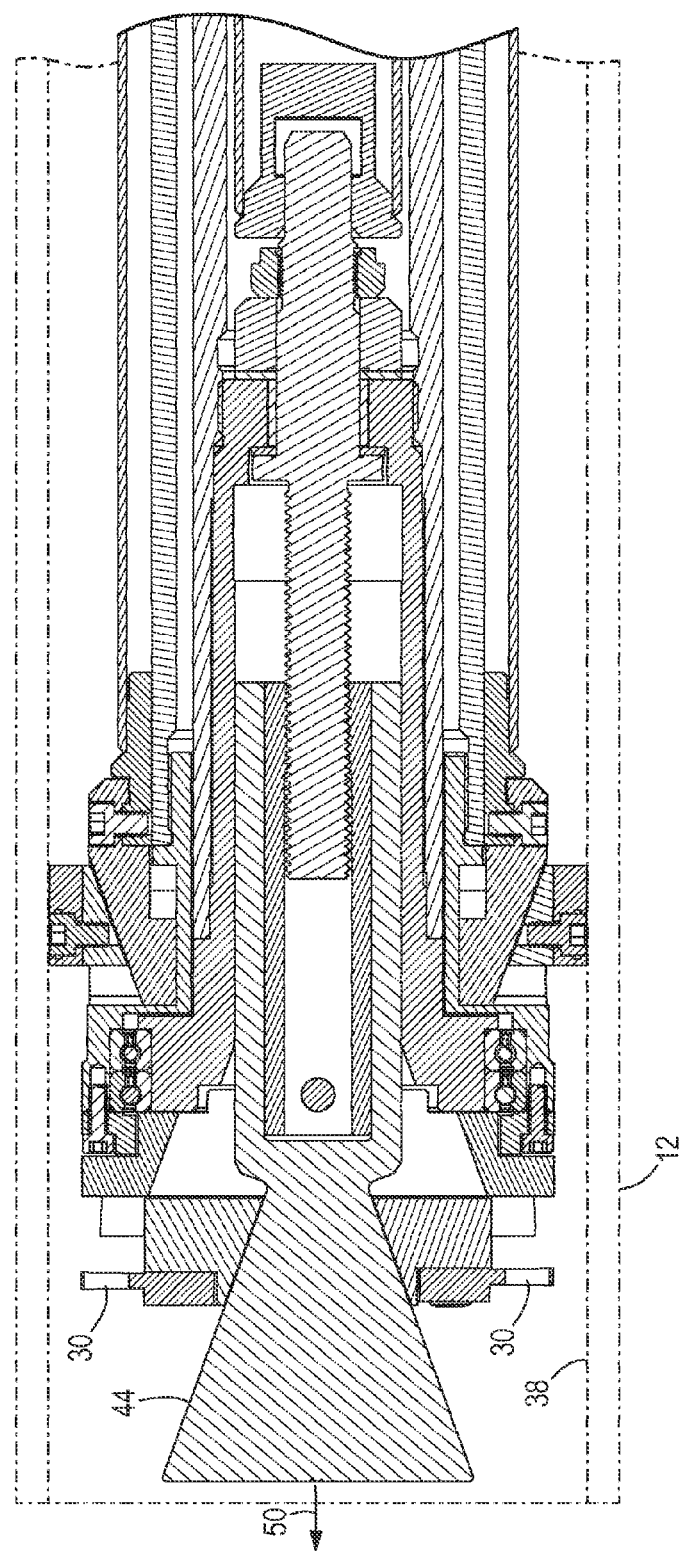
FIG. 6 illustrates the cross-sectional view of the embodiment of FIG. 5 with a wedge member having been moved outwardly to be disposed in an outward position so that cutting members are retracted away from the pipe.
Figure 7:
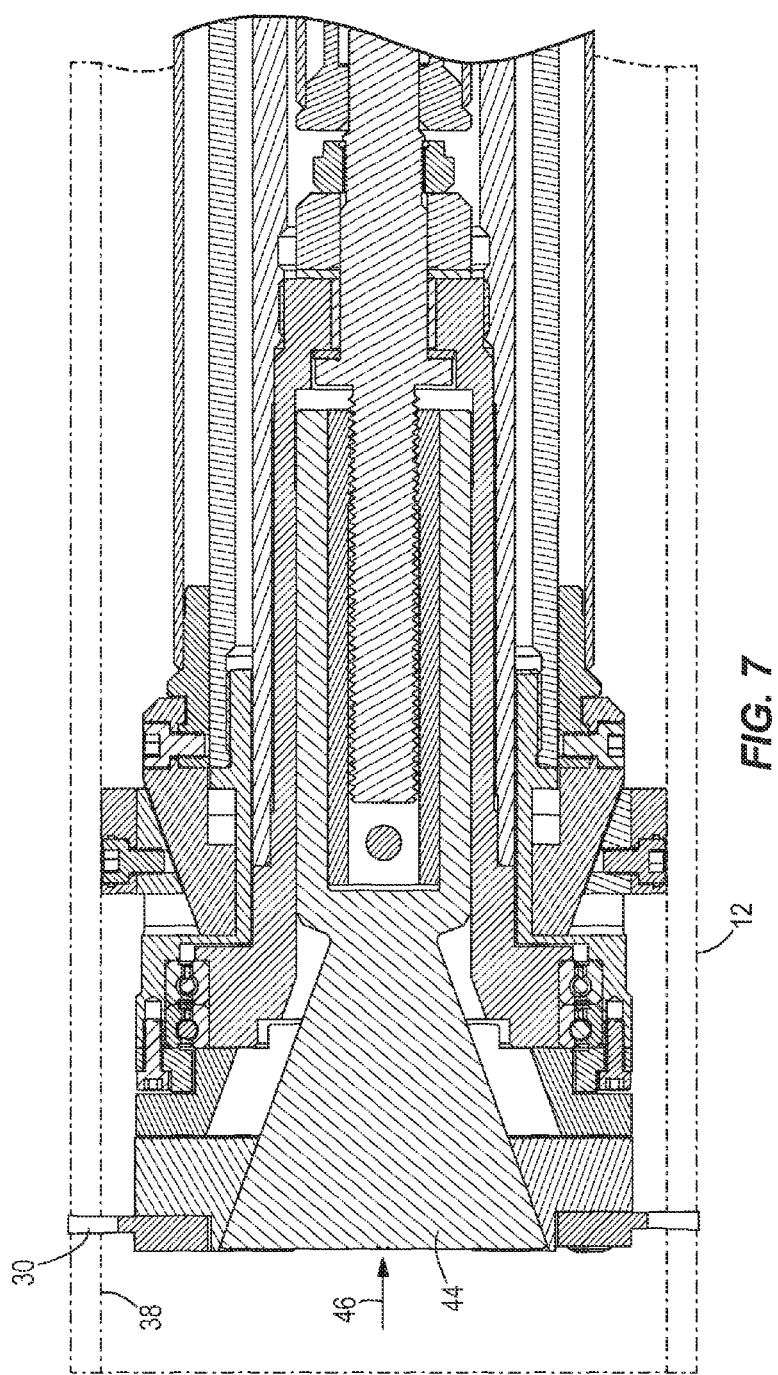
FIG. 7 illustrates the cross-section view of the embodiment of FIG. 5 with a wedge member having been moved inwardly to be disposed in an inward position so that the cutting members are extended against the pipe.
Figure 8:
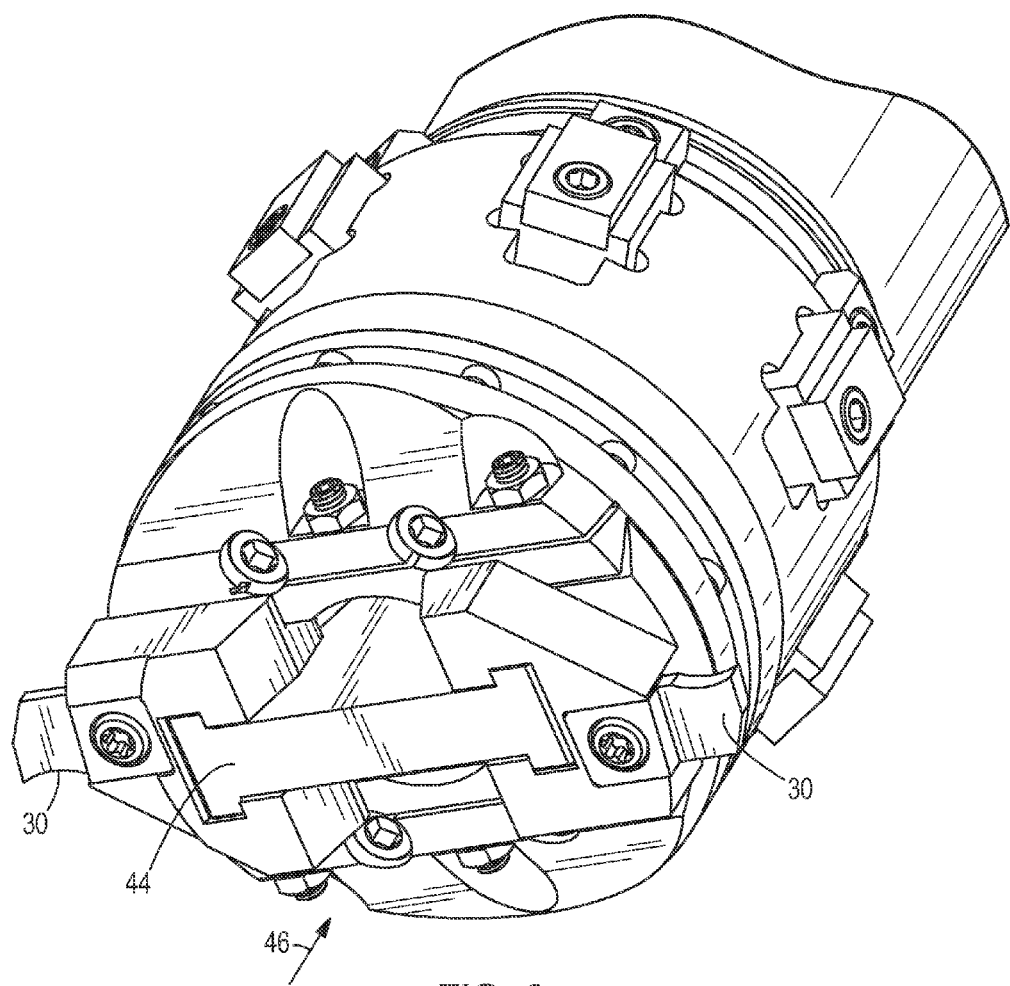
FIG. 8 illustrates the perspective view of the embodiment of FIG. 3 with a wedge member having been moved inwardly from the outward position of FIG. 3 to the inward position of FIG. 8 in order to extend the cutting members from their retracted position of FIG. 3.

FIG. 6 illustrates the cross-sectional view of the embodiment of FIG. 5 with the wedge member 44 having been moved outwardly in direction 50 to be disposed in an outward (extended) position so that the cutting members 30 are retracted away from the inner surface 38 of the pipe 12. FIG. 7 illustrates the cross-section view of the embodiment of FIG. 5 with the wedge member 44 having been moved inwardly in direction 46 to be disposed in an inward (retracted) position so that the cutting members 30 are extended (abutted) against the inner surface 38 of the pipe 12. FIG. 8 illustrates the perspective view of the embodiment of FIG. 3 with the wedge member 44 having been moved inwardly in direction 46 from the outward (extended) position of FIG. 3 to the inward (refracted) position of FIG. 8 in order to extend the cutting members 30 from their retracted position of FIG. 3.

Referring again collectively to FIGS. 4-5, the causation of the rotation of cutting members 30, as shown by solid lines 86, will now be described. As previously discussed, when motor 42 rotates gear 56 around axis 60, gear 56 causes gear 64 to rotate around axis 66. Rotation of gear 64 causes attached components fasteners 88, shaft 90, shaft 92, shaft 94, shaft 96, shaft 98, shaft 100, shaft 102, and cutting members 30 to rotate. Gears 62 and 64 rotate around axis 66 at differing speeds due to the respective gear-ratio differential caused by gears 54 and 56 being of different size. As a result, the feed rate of wedge member 44 in inward direction 46 (which is reliant upon the gear speed of gear 62 and causes cutting members 30 to gradually move in direction 36 and abut against the inner surface 38 of the pipe 12) is different than the rotation rate (cutting rate/drive rate) of cutting members 30 (which is reliant upon the gear speed of gear 64 and causes the inner surface 38 of the pipe 12 to be cut as the cutting members 30 rotate). For purposes of this disclosure, the term "drive member" is defined as any component of the apparatus 10 which causes the rotation of cutting members 30. The drive members include but are not limited to motor 42, gear 56, gear 64, fasteners 88, shaft 90, shaft 92, shaft 94, shaft 96, shaft 98, shaft 100, and shaft 102.

It is noted that housing members 99 and 101 are attached together with fastener 103. Housing member 101 is attached to shaft 90 with bearing 105. Nuts 107 and 109 are attached to shaft 110 to hold housing member 101 in place. Bearing 111 is attached between shaft 70 and gear 64. Nuts 113 and 115 are attached to screw 78 and hold screw 78 in position relative to shaft 94. Bearing 117 is attached between shaft 94 and shaft 96. Fasteners 119 attach shaft 121 to shaft 96. Cutting members 30 are attached to housing member 31.

The causation of the extension in direction 36 and the retraction in direction 52 of the feet 34, as shown by the dashed lines 104, will now be described. When the knobs 32 are rotated clockwise, the rotation of the knobs 32 causes attached components pins 106 and shaft 108 to rotate clockwise with the knobs 32. The shaft 108 is threadedly attached to shaft 110 (stationary member) which is fixed in place and does not move relative to any of the moving components involved in the wedge movement (feed), the cutting members' movement (rotation/drive), or the clamping movement as discussed above. Bearing 112 is disposed within shaft 108. Shaft 108 moves relative to bearing 112. When the shaft 108 rotates clockwise around the fixed shaft 110, the shaft 108 moves in direction 50 along shaft 110 causing bearing 112 to move in direction 50 along shaft 110. When bearing 112 moves in direction 50 along the shaft 110, shaft 20 which is attached to bearing 112 also moves in direction 50 along the shaft 110. Movement of shaft 20 in direction 50 along the shaft 110 causes attached components shaft 114, fasteners 116, and wedge-shaped shaft 118 to also move in direction 50 along the shaft 110. Movement of wedge-shaped shaft 118 in direction 50 causes attached legs 120, fasteners 122, and feet 34 to move outwardly in direction 36 so that the feet 34 abut against the inner surface 38 of the pipe 12 in order to clamp the apparatus 10 against the pipe 12. As shown in FIG. 1, the feet 34 are disposed in slots 124 causing the legs 120, fasteners 122, and feet 34 to only move in direction 36 and to not rotate.

Conversely, when the knobs 32 are rotated counter-clockwise, the rotation of the knobs 32 causes attached components pins 106 and shaft 108 to rotate counter-clockwise with the knobs 32. When the shaft 108 rotates counter-clockwise around the fixed shaft 110, the shaft 108 moves in direction 46 along shaft 110 causing bearing 112 to move in direction 46 along shaft 110. When bearing 112 moves in direction 46 along the shaft 110, shaft 20 which is attached to bearing 112 also moves in direction 46 along the shaft 110. Movement of shaft 20 in direction 46 along the shaft 110 causes attached components shaft 114, fasteners 116, and wedge-shaped shaft 118 to also move in direction 46 along the shaft 110. Movement of wedge-shaped shaft 118 in direction 46 causes attached legs 120, fasteners 122, and feet 34 to move inwardly in direction 52 so that the feet 34 retract away from the inner surface 38 of the pipe 12 in order to de-clamp the apparatus 10 from the pipe 12. As shown in FIG. 1, the slots 124 within which the feet 34 are disposed in cause the legs 120, fasteners 122, and feet 34 to only move in direction 52 and to not rotate. For purposes of this disclosure, the term "clamping member" is defined as any component of the apparatus 10 which clamps/secures the apparatus 10 to the pipe 12. The clamping members include but are not limited to knobs 32, pins 106, shaft 108, bearing 112, shaft 20, shaft 114, fasteners 116, wedge-shaped shaft 118, legs 120, fasteners 122, and feet 34.

As shown in FIG. 4, cone 18 is slide-ably disposed over shaft 20. The cone 18 is configured to slide up and down along shaft 20 in directions 22 to center the apparatus 10 within the pipe 12. When the apparatus 10 is inserted into the pipe 12 the cone 16 rests against the top portion 28 of the pipe 12 in order to center the apparatus 10 within the pipe 12 as discussed previously with respect to FIG. 1.

FIG. 9 illustrates a perspective view of a clutch assembly 125 of the apparatus 10 of the embodiment of FIG. 1 with the clutch member 48 disposed in a down position and the clutch assembly 125 being engaged. Pin members 126 are disposed in slots 128 of gear 62. Spring 73 forces shaft 71 and pin members 126 in direction 50 so that pin members 126 are retained in slots 128 of gear 62 as long as the force of spring 73 in direction 50 is greater than the force in opposite direction 46 provided as a result of the cutting members 30 being pushed against the wedge member 44 by the inner surface 38 of the pipe 12 which correspondingly pushes the wedge member 44 and all of its connected parts in opposite direction 46. Since the pin members 126 are retained in the slots 128, when gear 54 rotates gear 62 the pin members 126 rotate with gear 62 causing shaft 69, shaft 71, spring 73, and clutch member 48 to rotate with gear 62. This causes the movement (feed) of wedge member 44 inward in direction 46 when gear 62 is moving clockwise and outward in direction 50 when gear 62 is moving counter-clockwise as discussed earlier with respects to FIGS. 4 and 5 collectively and as shown by phantom lines 67 in those Figures. Gear 64 is shown in FIG. 9 but does not contribute to the movement (feed) of wedge member 44.

FIG. 10 illustrates the clutch assembly 125 of the embodiment of FIG. 9 with the clutch member 48 disposed in the down position and the clutch assembly 125 disengaged. Pin members 126 have come out of slots 128 of gear 62 as a result of the force in opposite direction 46, provided as a result of the cutting members 30 being pushed against the wedge member 44 by the inner surface 38 of the pipe 12 which correspondingly pushes the wedge member 44 and all of its connected parts in opposite direction 46, being greater than the force of the spring 73 in direction 50. Since the pin members 126 are no longer retained in the slots 128, when gear 54 rotates gear 62 the pin members 126 and its connected shaft 69, shaft 71, spring 73, and clutch member 48 do not rotate with gear 62. As a result, the movement (feed) of the wedge member 44 and all of its connected parts described previously is disconnected from the rotation of gear 62 so that gear 62 no longer moves the wedge member 44 in either direction 46 or in direction 50. The size of the spring 73 and its corresponding force in direction 50 may be chosen to protect the cutting members 30 and the motor 42 (shown in FIG. 4) from being damaged.

FIG. 11 illustrates the perspective view of the clutch assembly 125 of the embodiment of FIG. 9 with the clutch member 48 having been manually moved upward in direction 46 to an up position to disengage the clutch assembly 125. When clutch member 48 is moved to this up position, spring 73, shaft 71, shaft 69, and pin members 126 also move upward in direction 46 releasing the pin members 126 from the slots 128 of gear 62. Since the pin members 126 are no longer retained in the slots 128, when gear 54 rotates gear 62 the pin members 126 and its connected shaft 69, shaft 71, spring 73, and clutch member 48 do not rotate with gear 62. As a result, the movement (feed) of the wedge member 44 and all of its connected parts described previously is disconnected from the rotation of gear 62 so that gear 62 no longer moves the wedge member 44 in either direction 46 or in direction 50. As discussed previously with respect to FIG. 1, when an operator is done cutting a pipe 12 the operator can manually move the clutch member 48 upward in direction 46 into the disengagement position of FIG. 11 to disengage the wedge member 44 from the motor 42 to allow the wedge member 44 to be moved outwardly in direction 50 in order to retract the cutting members 30 from the inner surface 38 of the pipe 12.

Figure 12:
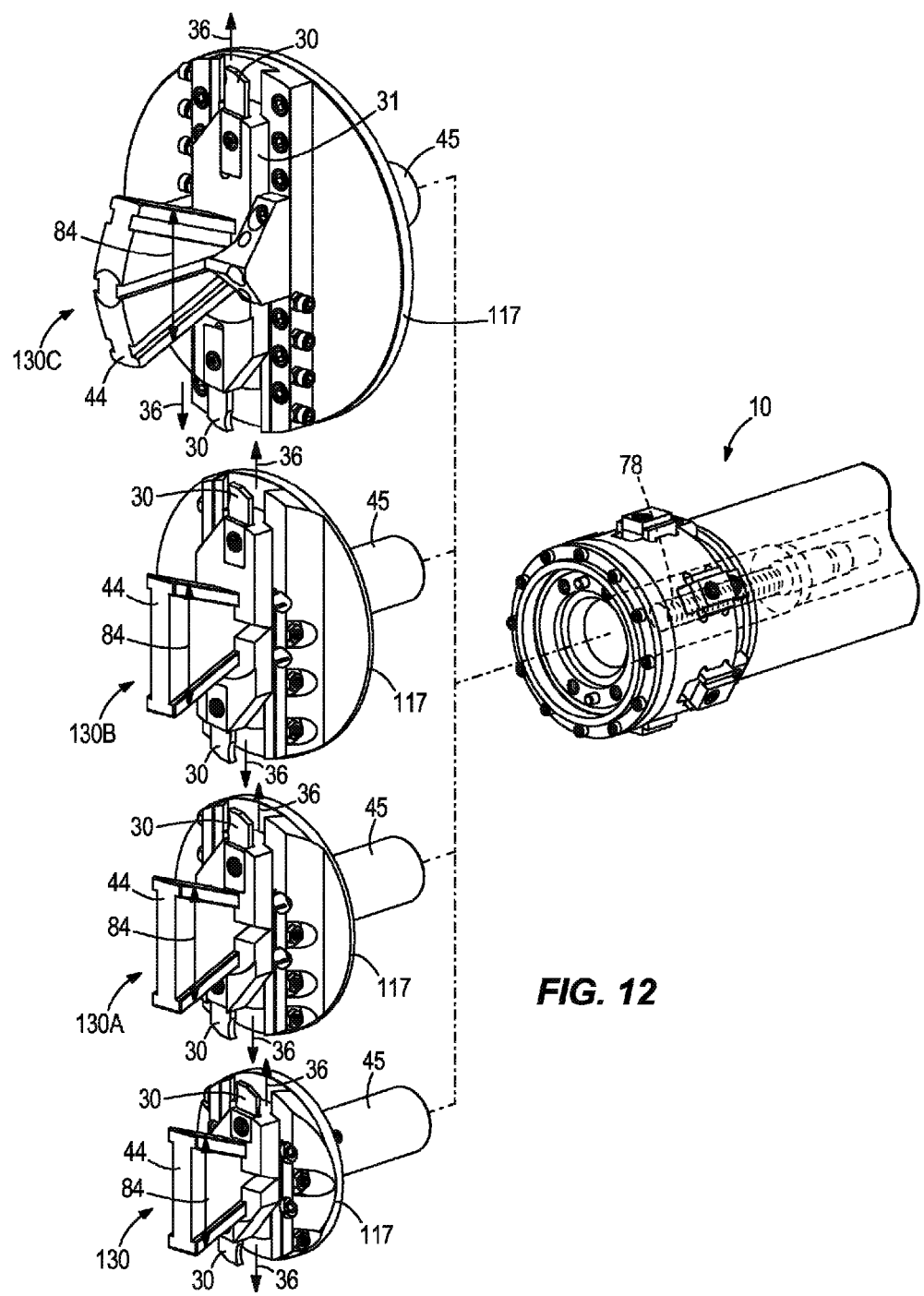
FIG. 12 illustrates a perspective view of a bottom portion of the apparatus of the embodiment of FIG. 1 with an attachment assembly removed from the apparatus, and additionally shows a kit of varying sized attachment assemblies which are each configured to be attached to the apparatus in order to cut varying sized pipes internally.

FIG. 12 illustrates a perspective view of a bottom portion of the apparatus 10 of the embodiment of FIG. 1 (see also the cross-sectional view of FIG. 5) with attachment assembly 130 removed from screw 78 of the apparatus 10, and additionally shows a kit of varying sized attachment assemblies 130A, 130B, and 130C which are each configured to be attached to screw 78 of the apparatus in order to cut varying sized pipes internally. Attachment assemblies 130, 130A, 130B, and 130C each comprise a wedge member 44, a wedge shaft 45, cutting members 30, and housing members 31 and 117. As the sizes of the attachment assemblies 130, 130A, 130B, and 130C increase larger pipes may be cut internally due to the increase in the size (width 84) of their respective wedge members 44 (feed members) which causes their respective cutting members 30 to extend farther outward in direction 36. As a result, based on the size of the pipe to be cut internally the operator chooses the appropriate sized attachment assembly 130, 130A, 130B, and 130C from the kit and attaches it to screw 78 of the apparatus 10 prior to cutting the pipe. In such manner, varying sized pipes may be cut internally. It is noted that the attachment assemblies 130, 130A, 130B, and 130C each have their own cutting members 30. However, in other embodiments the attachment assemblies 130, 130A, 130B, and 130C may be used to feed the same cutting members to cut varying sized pipes.

Figure 13:
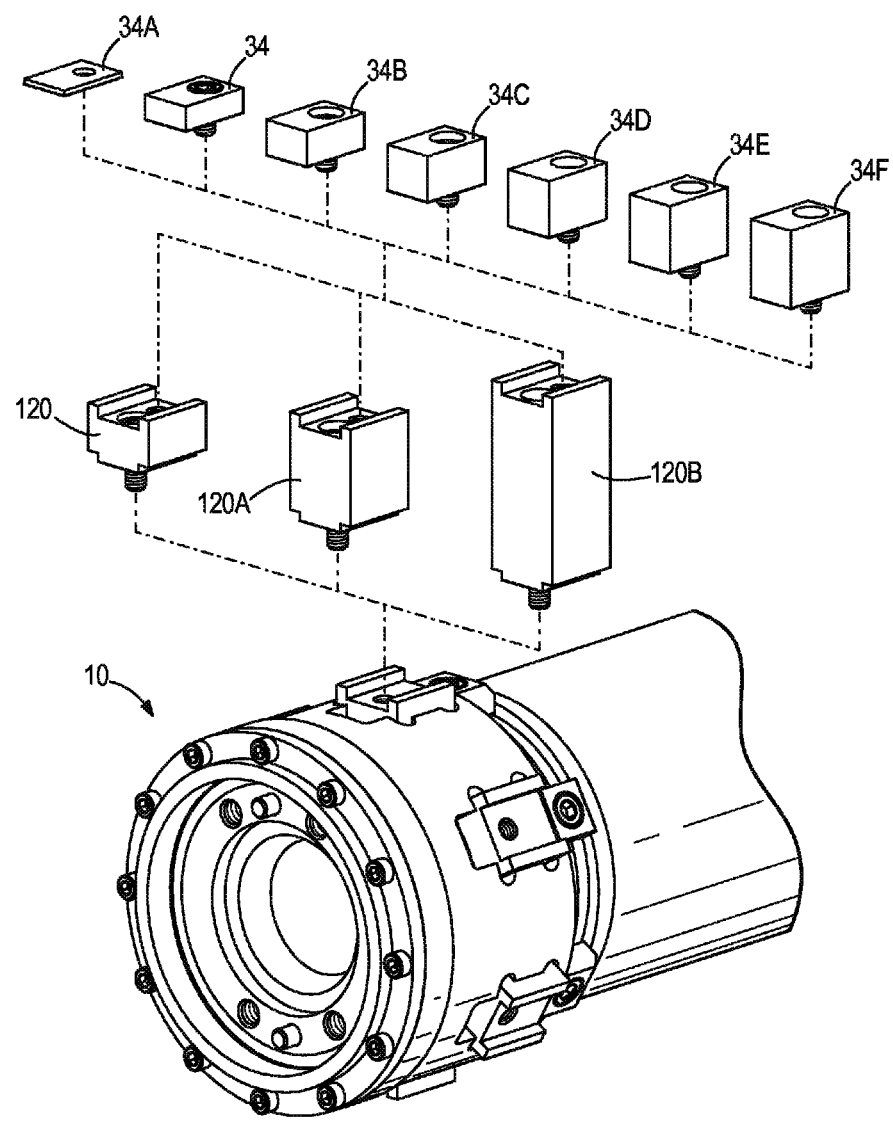
FIG. 13 illustrates a perspective view of a bottom portion of the apparatus of the embodiment of FIG. 1 with legs and feet removed from the apparatus, and additionally shows a kit of varying sized clamping assemblies comprising legs and feet which are each configured to be threadedly attached to the apparatus.

FIG. 13 illustrates a perspective view of a bottom portion of the apparatus 10 of the embodiment of FIG. 1 with legs 120 and feet 34 removed from the apparatus 10, and additionally shows a kit of varying sized clamping assemblies comprising legs 120A and 120B and feet 34A, 34B, 34C, 34D, 34E, and 34F (i.e. varying sized clamping members) which are each configured to be threadedly attached to the apparatus 10. The operator selects whatever combination of legs 120, 120A, and 120B and feet 34, 34A, 34B, 34C, 34D, 34E, and 34F has an overall height which will allow the apparatus 10 to be clamped internally to the pipe being cut. Smaller overall height legs 120 and 120A and feet 34 and 34A are used to clamp the apparatus 10 to smaller pipes and larger overall height legs 120 and 120A and feet 34 and 34A are used to clamp the apparatus 10 to larger pipes. In such manner the apparatus 10 may be clamped within varying sized pipes.

Figures 14, 15:
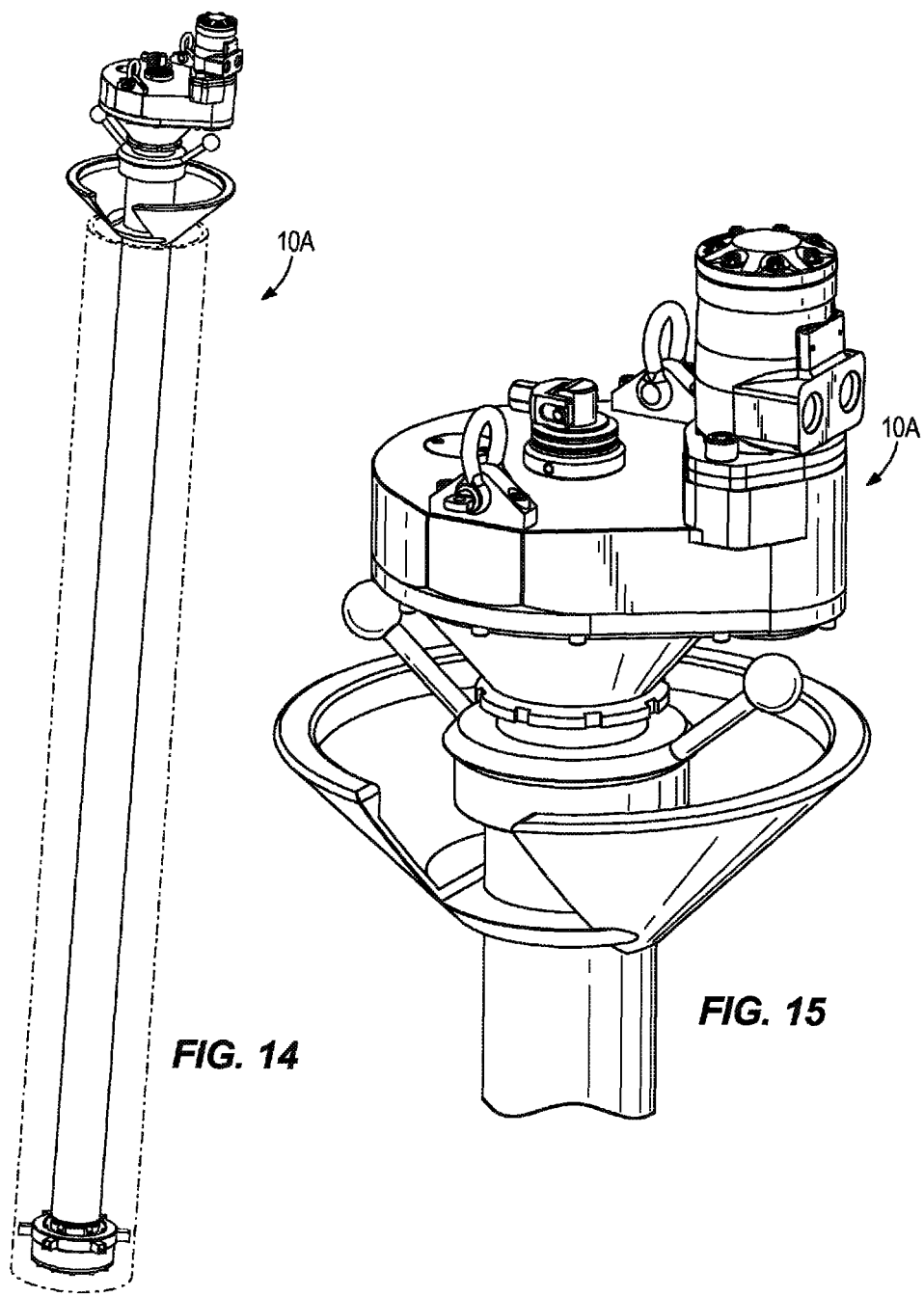
FIG. 14 illustrates a second pipe cutting apparatus differing in size than the first pipe cutting apparatus of the embodiment of FIG. 1.
FIG. 15 illustrates a top portion of the second pipe cutting apparatus of the embodiment of FIG. 14.
Figure 16:
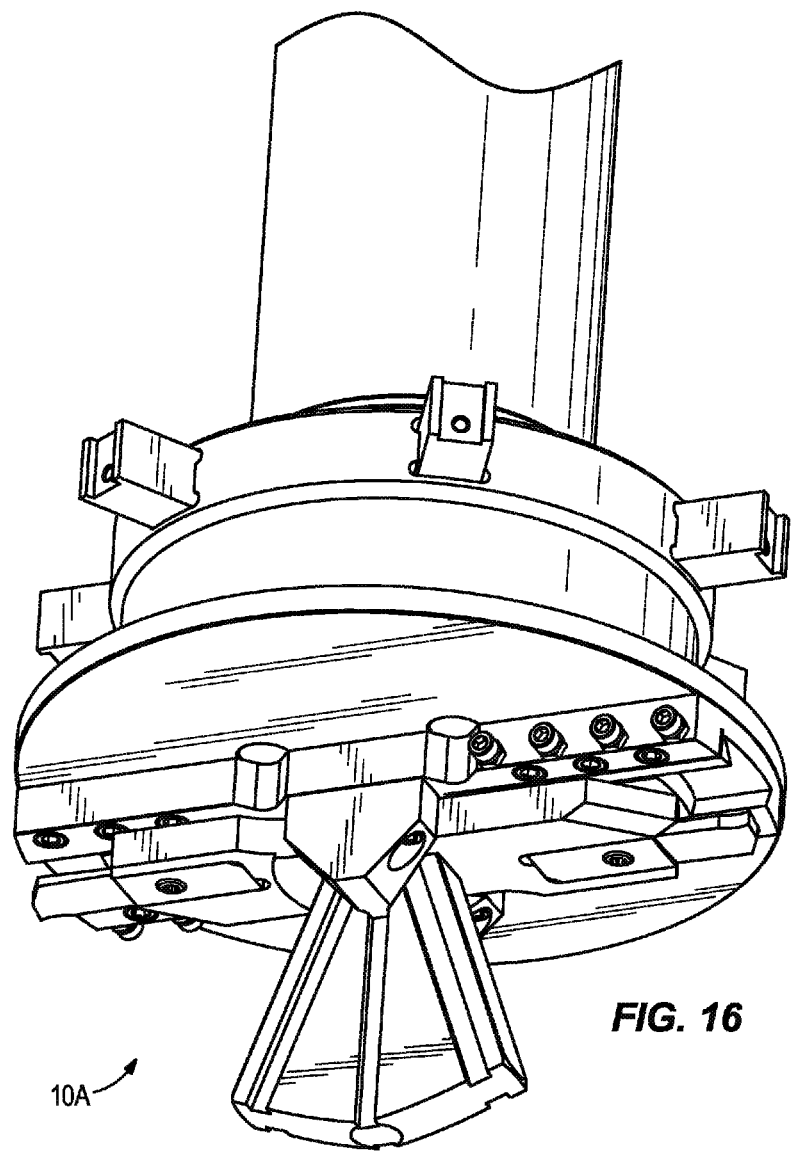
FIG. 16 illustrates a bottom portion of the second pipe cutting apparatus of the embodiment of FIG. 14.
Figure 17:
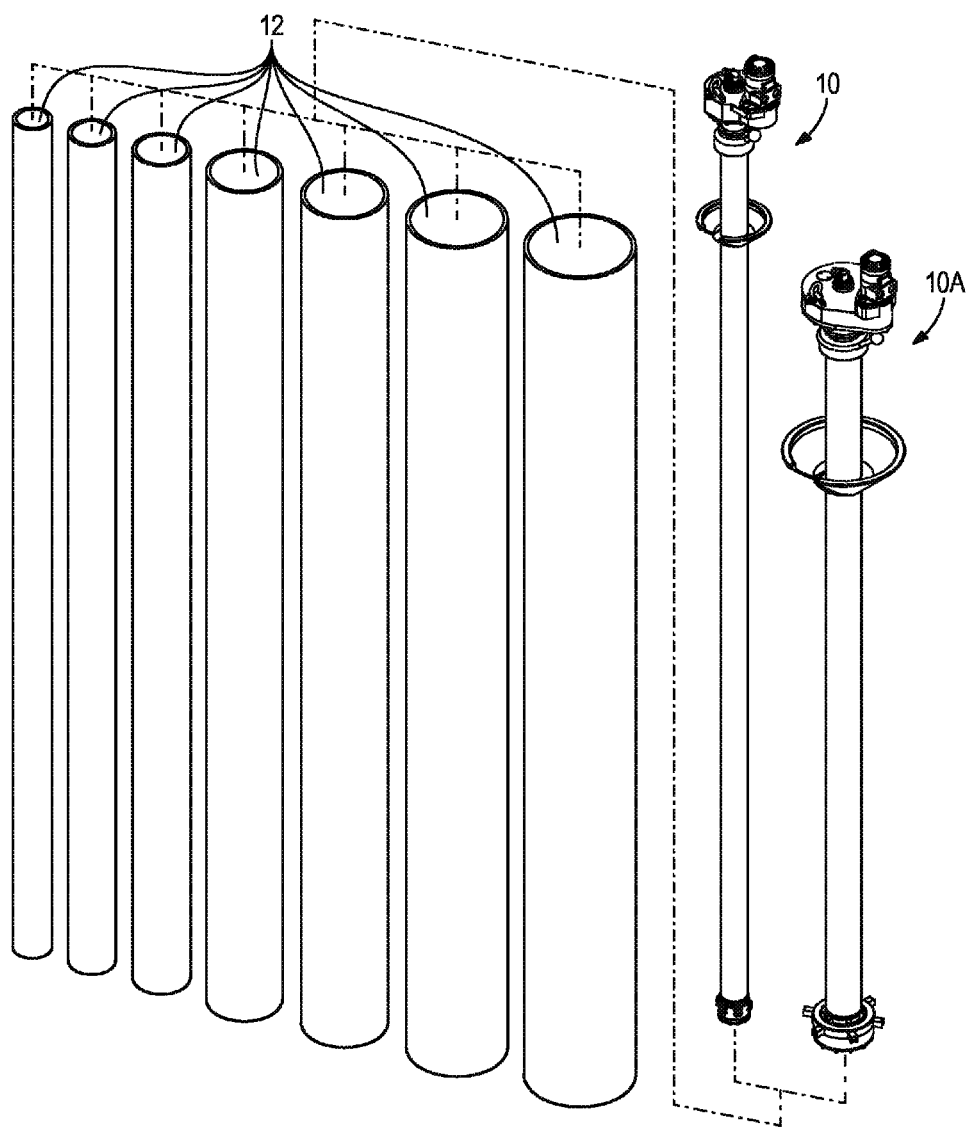
FIG. 17 illustrates a perspective view of one embodiment of a kit comprising the first pipe cutting apparatus of the embodiment of FIG. 1 and the second pipe cutting apparatus of the embodiment of FIG. 14 which may be chosen to cut varying sized pipes internally.

FIG. 14 illustrates a second pipe cutting apparatus 10A differing in size than the first pipe cutting apparatus 10 of the embodiment of FIG. 1. The components of the second pipe cutting apparatus 10A of FIG. 14 are identical in all respects to the components of the first pipe cutting apparatus of FIG. 1 with the exception that they differ in size. FIG. 15 illustrates a top portion of the second pipe cutting apparatus 10A of the embodiment of FIG. 14. FIG. 16 illustrates a bottom portion of the second pipe cutting apparatus 10A of the embodiment of FIG. 14. FIG. 17 illustrates a perspective view of one embodiment of a kit comprising the first pipe cutting apparatus 10 of the embodiment of FIG. 1 and the second pipe cutting apparatus 10A of the embodiment of FIG. 14 which may be chosen to cut varying sized pipes internally. The operator chooses the appropriately sized pipe cutting apparatus from the kit of first and second pipe cutting apparatus 10 and 10A in order to fit appropriately within the pipe being cut with larger pipe cutting apparatus being used to cut larger pipes (i.e. larger feed members such as larger wedge members, larger clamping members such as larger legs and feet, and larger drive members) and smaller pipe cutting apparatus being used to cut smaller pipes (i.e. smaller feed members such as smaller wedge members, smaller clamping members such as smaller legs and feet, and smaller drive members). In such manner, varying sized pipes may be cut internally.

Figure 18:
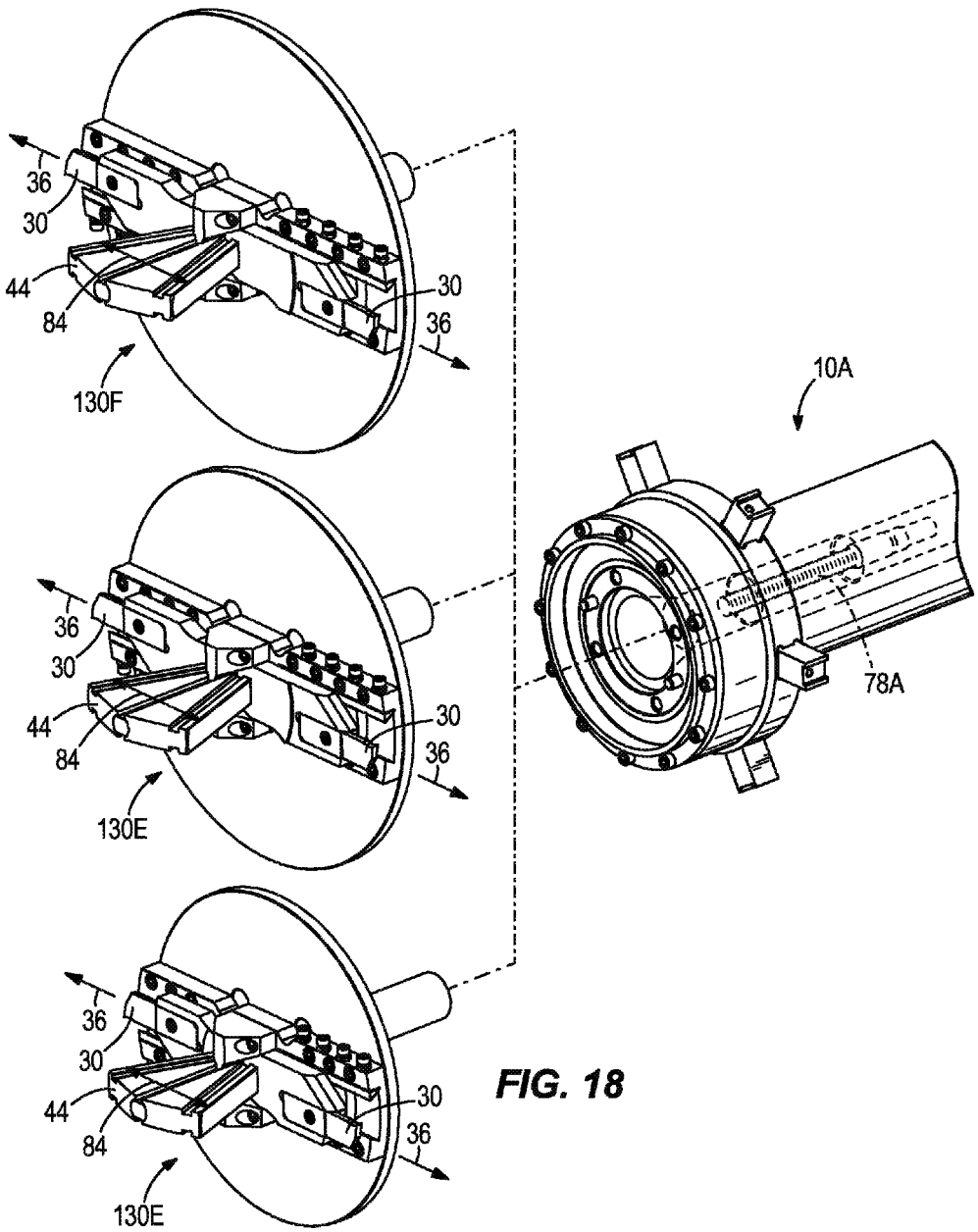
FIG. 18 illustrates a perspective view of a bottom portion of the second apparatus of the embodiment of FIG. 14 with attachment assemblies separated from the second apparatus which are identical in all respects to the attachment assemblies of the embodiment of FIG. 12 with the exception that they vary in size.

FIG. 18 illustrates a perspective view of a bottom portion of the second apparatus 10A of the embodiment of FIG. 14 with attachment assemblies 130D, 130E, and 130F separated from the second apparatus 10A and identical in all respects to the components of the attachment assemblies 130, 130A, 130B, and 130C of the embodiment of FIG. 12 with the exception that the attachment assemblies 130D, 130E, and 130F vary in size from the attachment assemblies 130, 130A, 130B, and 130C. As the sizes of the attachment assemblies 130D, 130E, and 130F increase larger pipes may be cut internally due to the increase in the size (width 84) of their respective wedge members 44 (feed members) which causes their respective cutting members 30 to extend farther outward in direction 36. As a result, based on the size of the pipe to be cut internally the operator chooses the appropriate sized attachment assembly 130D, 130E, and 130F from the kit and attaches it to screw 78A of the second apparatus 10A prior to cutting the pipe. In such manner, varying sized pipes may be cut internally.

Figure 19:
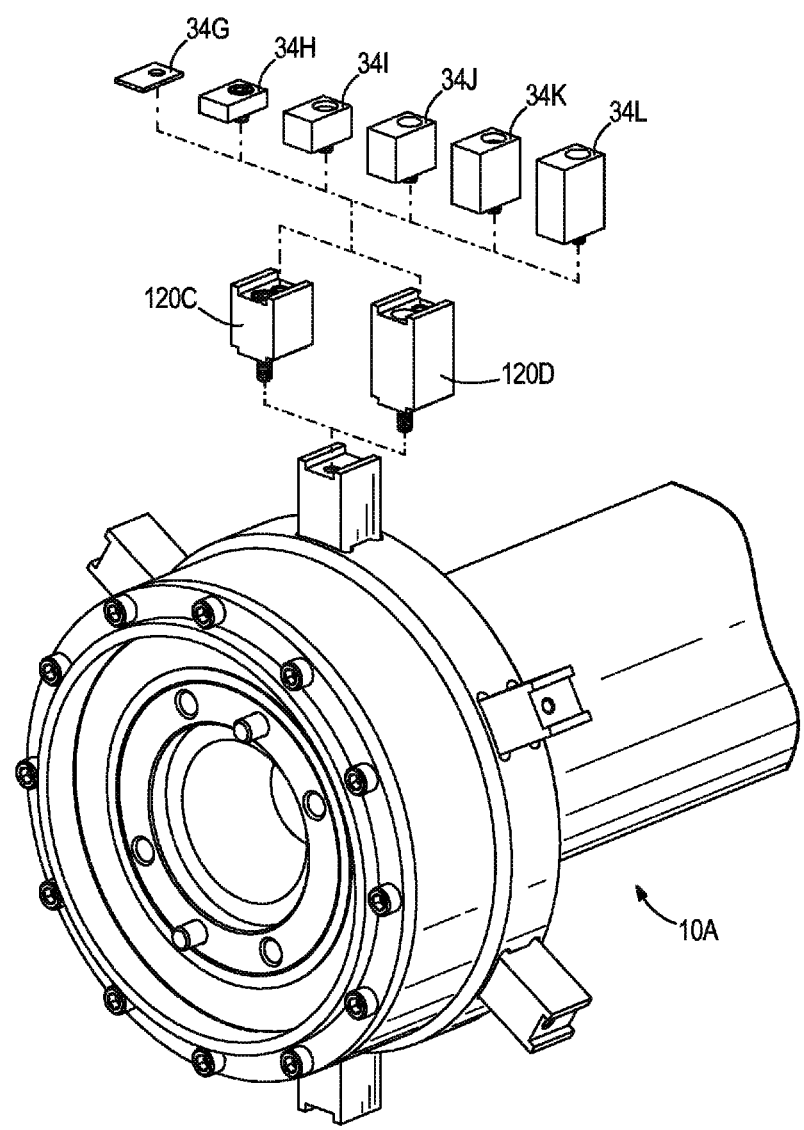
FIG. 19 illustrates a perspective view of a bottom portion of the second apparatus of the embodiment of FIG. 14 with legs and feet separated from the second apparatus which are identical to the legs and feet of the embodiment of FIG. 13 in all respects with the exception that they vary in size.

FIG. 19 illustrates a perspective view of a bottom portion of the second apparatus 10A of the embodiment of FIG. 14 with legs 120C and 120D and feet 34G, 34H, 34I, 34J, 34K, and 34L separated from the second apparatus 10A and identical to legs 120, 120A, and 120B and feet 34A, 34B, 34C, 34D, 34E, and 34F of the embodiment of FIG. 13 in all respects with the exception that legs 120C and 120D and feet 34G, 34H, 34I, 34J, 34K, and 34L vary in size from legs 120, 120A, and 120B and feet 34A, 34B, 34C, 34D, 34E, and 34F. The operator selects whatever combination of the kit clamping assemblies, comprising legs 120C and 120D and feet 34G, 34H, 34I, 34J, 34K, and 34L, has an overall height which will allow the second apparatus 10A to be clamped internally to the pipe being cut. Smaller overall height legs 120C and 120D and feet 34G, 34H, 34I, 34J, 34K, and 34L are used to clamp the second apparatus 10A to smaller pipes and larger overall height legs 120C and 120D and feet 34G, 34H, 34I, 34J, 34K, and 34L are used to clamp the second apparatus 10A to larger pipes. In such manner the second apparatus 10A may be clamped within varying sized pipes.

In other embodiments, the apparatus and their respective components of the disclosure may vary in any manner. For instance, one or more of their components may be varied or not used, and/or one or more additional components may be added.

Figure 20:
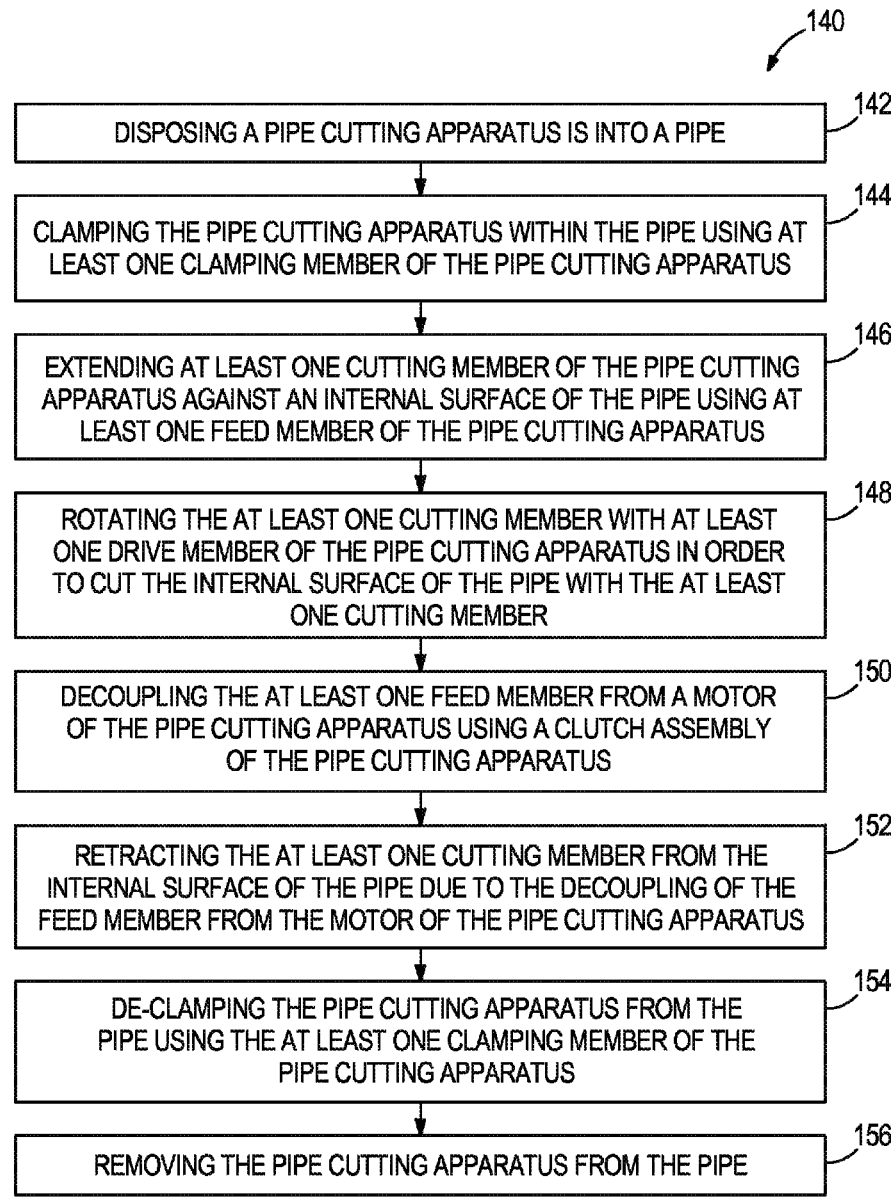
FIG. 20 is a flowchart illustrating one embodiment of a method for cutting pipes internally.

FIG. 20 is a flowchart illustrating one embodiment of a method 140 for cutting pipes internally. The method 140 may utilize any of the apparatus disclosed herein. In other embodiments, the method 140 may utilize varying apparatus. In step 142, a pipe cutting apparatus is disposed into a pipe. In one embodiment, step 142 may comprise using a centering member to center the pipe cutting apparatus within the pipe. In step 144, the pipe cutting apparatus is clamped within the pipe using at least one clamping member of the pipe cutting apparatus. In one embodiment, step 144 may be done manually. In step 146, at least one cutting member of the pipe cutting apparatus is extended against an internal surface of the pipe using at least one feed member of the pipe cutting apparatus. In one embodiment, step 146 may be done with a motor rotating a plurality of gears which move at least one wedge-shaped member. In step 148, the at least one cutting member is rotated with at least one drive member of the pipe cutting apparatus in order to cut the internal surface of the pipe with the at least one cutting member. In one embodiment, step 148 may be done with a motor rotating a plurality of gears which rotate a shaft.

In step 150, the at least one feed member is decoupled from a motor of the pipe cutting apparatus using a clutch assembly of the pipe cutting apparatus. In one embodiment, step 150 may occur automatically when a force placed on the at least one cutting member exceeds a limit. In another embodiment, step 150 may be done manually by moving a clutch member of the clutch assembly to a position. In step 152, the at least one cutting member is retracted from the internal surface of the pipe due to the decoupling of the feed member from the motor of the pipe cutting apparatus. In step 154, the pipe cutting apparatus is de-clamped from the pipe using the at least one clamping member of the pipe cutting apparatus. In one embodiment, step 154 may be done manually. In step 156, the pipe cutting apparatus is removed from the pipe. In another embodiments, one or more steps of the method 140 may be altered in order or in substance, one or more steps of the method 140 may not be followed, or one or more additional steps may be added to the method 140.

Figure 21:
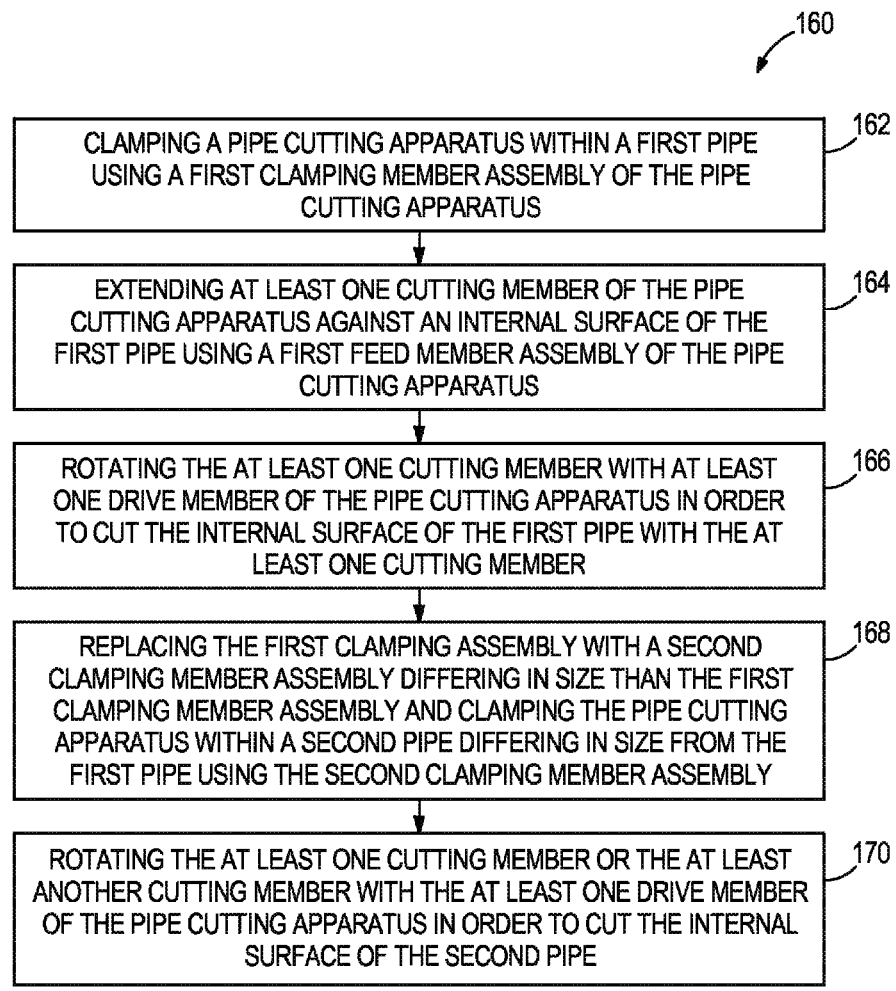
FIG. 21 is a flowchart illustrating one embodiment of a method for cutting differing sized pipes internally.

FIG. 21 is a flowchart illustrating one embodiment of a method 160 for cutting differing sized pipes internally. The method 160 may utilize any of the apparatus disclosed herein. In other embodiments, the method 160 may utilize varying apparatus. In step 162, a pipe cutting apparatus is clamped within a first pipe using a first clamping member assembly of the pipe cutting apparatus. In one embodiment, step 162 may be done manually. In step 164, at least one cutting member of the pipe cutting apparatus is extended against an internal surface of the first pipe using a first feed member assembly of the pipe cutting apparatus. In one embodiment, step 164 may be done using at least one motor of the pipe cutting apparatus. In step 166, the at least one cutting member is rotated with at least one drive member of the pipe cutting apparatus in order to cut the internal surface of the first pipe with the at least one cutting member.

In step 168, the first clamping assembly is replaced with a second clamping member assembly differing in size than the first clamping member assembly and the pipe cutting apparatus is clamped (in one embodiment this may be done manually) within a second pipe differing in size from the first pipe using the second clamping member assembly. Alternatively, in step 168 the first feed member assembly is replaced with a second feed member assembly differing in size than the first feed member assembly and the at least one cutting member or at least another cutting member of the pipe cutting apparatus is extended (in one embodiment this may be done using at least one motor of the pipe cutting apparatus) against an internal surface of the second pipe using the second feed member assembly. In step 170, the at least one cutting member or the at least another cutting member is rotated with the at least one drive member of the pipe cutting apparatus in order to cut the internal surface of the second pipe. In one embodiment, step 170 may be done using at least one motor of the pipe cutting apparatus. In another embodiments, one or more steps of the method 160 may be altered in order or in substance, one or more steps of the method 160 may not be followed, or one or more additional steps may be added to the method 160.

One or more embodiments of the disclosure reduce one or more issues of one or more of the current apparatus, kits, or methods for internally cutting pipes in or out of the ground. For instance, one or more embodiments of the disclosure may reduce the difficulty in using the apparatus to cut varying sized pipes, reduce the difficulty in centering the apparatus in a pipe, reduce the difficulty in securing the apparatus to a pipe, reduce the difficulty in abutting a cutting member of the apparatus against a pipe, reduce the difficulty in driving a cutting member of the apparatus against a pipe, reduce the difficulty in protecting a cutting member of the apparatus in the event of excessive force during cutting a pipe, reduce the difficulty in removing the apparatus from a pipe, or reduce one or more other difficulties.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the disclosure is defined by the appended claims. Accordingly, the disclosure is not to be restricted except in light of the appended claims and their equivalents.

The invention claimed is:
1. An apparatus for cutting pipes internally comprising:
at least one cutting member to cut a pipe internally;
at least one drive member to rotate the at least one cutting member to cut the pipe internally;

at least one feed member to extend the at least one cutting member against the pipe internally and to retract the at least one cutting member from the pipe internally; and at least one clamping member to secure the apparatus to the pipe internally;

wherein at least one of the following 7 limitations is present: (1) the at least one drive member comprises at least one motor connected to a plurality of gears which use a gear ratio to drive the at least one drive member; (2) the at least one feed member comprises at least one motor connected to a plurality of gears which use a gear ratio to feed the at least one feed member; (3) further comprising at least one motor connected to a plurality of gears which drive the at least one drive member and feed the at least one feed member at different speeds due to a gear ratio of the plurality of gears; (4) when the apparatus is inserted into a pipe the at least one clamping member is configured to extend outwardly away from a shaft against which it is disposed towards and against an inner surface of the pipe, and to retract inwardly towards the shaft away from the inner surface of the pipe; (5) the at least one clamping member comprises a wedge-shaped member and at least one foot member which extends and retracts due to a shape of the wedge-shape member; (6) further comprising a clutch assembly and at least one motor, wherein the clutch assembly automatically decouples the at least one feed member from the at least one motor when a force placed on the at least one cutting member exceeds a limit; and/or (7) further comprising a clutch assembly comprising a manually operated clutch member which, when moved to a position, decouples the at least one feed member from at least one motor.

2. The apparatus of claim 1 wherein (1) the at least one drive member comprises the at least one motor connected to the plurality of gears which use the gear ratio to drive the at least one drive member.

3. The apparatus of claim 1 wherein the at least one feed member comprises a wedge-shaped member.

4. The apparatus of claim 1 wherein (2) the at least one feed member comprises the at least one motor connected to the plurality of gears which use the gear ratio to feed the at least one feed member.

5. The apparatus of claim 1 wherein (3) further comprising the at least one motor connected to the plurality of gears which drive the at least one drive member and feed the at least one feed member at different speeds due to the gear ratio of the plurality of gears.

6. The apparatus of claim 1 wherein (4) when the apparatus is inserted into the pipe the at least one clamping member is configured to extend outwardly away from the shaft against which it is disposed towards and against the inner surface of the pipe, and to retract inwardly towards the shaft away from the inner surface of the pipe.

7. The apparatus of claim 1 wherein (5) the at least one clamping member comprises the wedge-shaped member and the at least one foot member which extends and retracts due to the shape of the wedge-shaped member.

8. The apparatus of claim 1 wherein the at least one drive member, the at least one feed member, and the at least one clamping member are located coaxially relative to one another.

9. The apparatus of claim 1 further comprising at least one centering member which centers the apparatus in a pipe.

10. The apparatus of claim 9 wherein the at least one centering member comprises a cone slideably moveable over a shaft.

11. The apparatus of claim 1 further comprising a stationary member which is fixed in position relative to the at least one drive member, the at least one feed member, and the at least one clamping member.

12. The apparatus of claim 1 wherein (6) further comprising the clutch assembly and the at least one motor, wherein the clutch assembly automatically decouples the at least one feed member from the at least one motor when the force placed on the at least one cutting member exceeds the limit.

13. The apparatus of claim 1 wherein (7) further comprising the clutch assembly comprising the manually operated clutch member which, when moved to the position, decouples the at least one feed member from the at least one motor.

14. An apparatus for cutting pipes internally comprising:
at least one cutting member to cut a pipe internally;
at least one drive member to rotate the at least one cutting member to cut the pipe internally;
at least one feed member to extend the at least one cutting member against the pipe internally and to retract the at least one cutting member from the pipe internally;
at least one motor; and
a plurality of connected differing sized gears connected to the at least one motor, to the at least one drive member, and to the at least one feed member;
wherein the at least one drive member rotates at a different drive rate than a feed rate of the at least one feed member due to a gear ratio of the plurality of connected differing sized gears.

15. A method of cutting pipes internally comprising:
disposing a pipe cutting apparatus into a pipe;
clamping the pipe cutting apparatus within the pipe using at least one clamping member of the pipe cutting apparatus;
extending at least one cutting member of the pipe cutting apparatus against an internal surface of the pipe using at least one feed member of the pipe cutting apparatus; and
rotating the at least one cutting member with at least one drive member of the pipe cutting apparatus in order to cut the internal surface of the pipe with the at least one cutting member;
wherein at least one of the following 7 limitations is present: (1) the at least one drive member comprises at least one motor connected to a plurality of gears, and further comprising driving the at least one drive member using a gear ratio; (2) the at least one feed member comprises at least one motor connected to a plurality of gears, and further comprising feeding the at least one feed member using a gear ratio; (3) further comprising at least one motor connected to a plurality of gears driving the at least one drive member and feeding the at least one feed member at different speeds due to a gear ratio of the plurality of gears; (4) further comprising extending the at least one clamping member outwardly away from a shaft against which it is disposed towards and against an inner surface of the pipe, and retracting the at least one clamping member inwardly towards the shaft away from the inner surface of the pipe; (5) the at least one clamping member comprises a wedge-shaped member and at least one foot member, and further comprising extending and retracting the at least one foot member due to a shape of the wedge-shape member; (6) further comprising automatically decoupling, using a clutch assembly, the at least one feed member from the at least one motor when a force placed on the at least one cutting member exceeds a limit; and/or (7) further comprising manually moving a clutch member of a clutch assembly decoupling the at least one feed member from at least one motor.

16. The method of claim 15 wherein (1) the at least one drive member comprises the at least one motor connected to the plurality of gears, and further comprising driving the at least one drive member using the gear ratio.

17. The method of claim 15 wherein (2) the at least one feed member comprises the at least one motor connected to the plurality of gears, and further comprising feeding the at least one feed member using the gear ratio.

18. The method of claim 15 wherein (3) further comprising the at least one motor connected to the plurality of gears driving the at least one drive member and feeding the at least one feed member at different speeds due to the gear ratio of the plurality of gears.

19. The method of claim 15 wherein (4) further comprising extending the at least one clamping member outwardly away from the shaft against which it is disposed towards and against an inner surface of the pipe, and retracting the at least one clamping member inwardly towards the shaft away from the inner surface of the pipe.

20. The method of claim 15 wherein (5) the at least one clamping member comprises the wedge-shaped member and the at least one foot member, and further comprising extending and retracting the at least one foot member due to the shape of the wedge-shape member.

21. The method of claim 15 wherein (6) further comprising automatically decoupling, using the clutch assembly, the at least one feed member from the at least one motor when the force placed on the at least one cutting member exceeds the limit.

22. The method of claim 15 wherein (7) further comprising manually moving the clutch member of the clutch assembly decoupling the at least one feed member from the at least one motor.

* * * * *